US008515940B2

(12) United States Patent
Jones et al.

(10) Patent No.: US 8,515,940 B2
(45) Date of Patent: Aug. 20, 2013

(54) METHOD AND SYSTEM FOR QUALIFYING KEYWORDS IN QUERY STRINGS

(75) Inventors: Scott A Jones, Carmel, IN (US); Thomas E Cooper, Indianapolis, IN (US)

(73) Assignee: ChaCha Search, Inc, Carmel, IN (US)

( * ) Notice: Subject to any disclaimer, the term of this patent is extended or adjusted under 35 U.S.C. 154(b) by 0 days.

(21) Appl. No.: 13/557,646

(22) Filed: Jul. 25, 2012

(65) Prior Publication Data
US 2012/0317101 A1 Dec. 13, 2012

Related U.S. Application Data

(63) Continuation of application No. 11/777,505, filed on Jul. 13, 2007, now Pat. No. 8,255,383.

(60) Provisional application No. 60/807,421, filed on Jul. 14, 2006, provisional application No. 60/824,394, filed on Sep. 1, 2006.

(51) Int. Cl.
G06F 17/30 (2006.01)
(52) U.S. Cl.
USPC .......................................................... 707/708

(58) Field of Classification Search
None
See application file for complete search history.

(56) References Cited

U.S. PATENT DOCUMENTS

| | | | | |
|---|---|---|---|---|
| 7,305,415 B2* | 12/2007 | Vernau et al. | ........................ | 1/1 |
| 2004/0010564 A1* | 1/2004 | Imaida et al. | ................. | 709/217 |
| 2005/0114324 A1* | 5/2005 | Mayer | ................ | 707/3 |
| 2005/0149397 A1* | 7/2005 | Morgenstern et al. | .......... | 705/14 |
| 2006/0015401 A1* | 1/2006 | Chu et al. | ......................... | 705/14 |
| 2006/0064411 A1* | 3/2006 | Gross et al. | ....................... | 707/3 |
| 2006/0184566 A1* | 8/2006 | Lo et al. | ......................... | 707/102 |
| 2006/0248078 A1* | 11/2006 | Gross et al. | ....................... | 707/5 |
| 2007/0192168 A1* | 8/2007 | Van Luchene | .................. | 705/10 |
| 2011/0106617 A1* | 5/2011 | Cooper et al. | ............. | 705/14.49 |

* cited by examiner

*Primary Examiner* — Bai D. Vu
(74) *Attorney, Agent, or Firm* — Staas & Halsey

(57) ABSTRACT

A method and system for qualifying keyword(s) or phrase(s) to formulate a query string for submitting a search request when the query string contains one or more keywords that may have multiple meanings associated therewith. Database information containing keywords and associated meanings or forms of the keywords is maintained and a requester is prompted to identify one or more of the meanings of a keyword when building the query string. One or more advertisements pertaining to the associated meanings or forms of the keywords in the query string is presented to the requester submitting a search request.

20 Claims, 12 Drawing Sheets

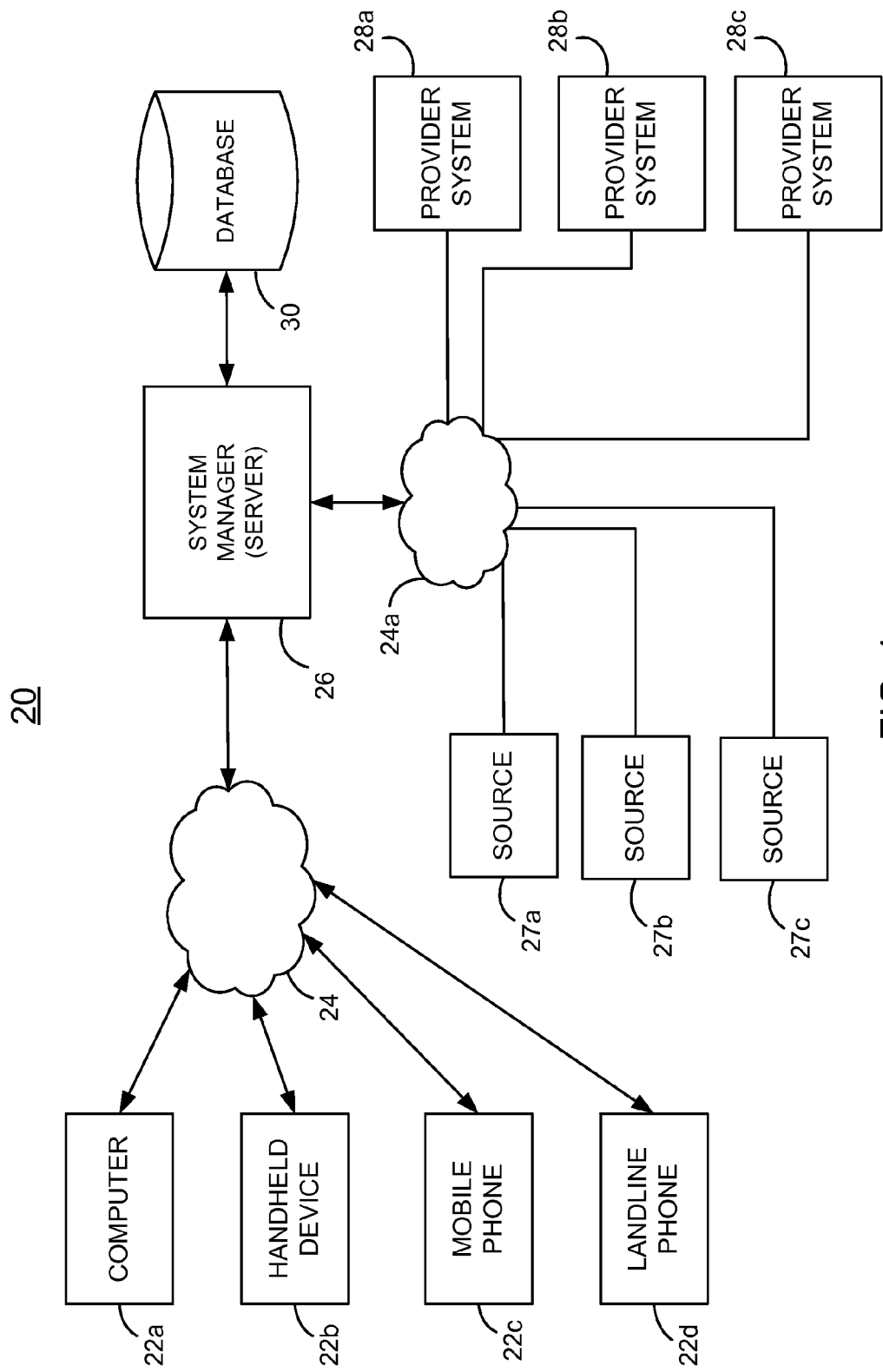

| KEYWORDS 42 | CATEGORY 44 | USAGE 46 |
|---|---|---|
| APPLE | FRUIT | 60% |
| | COMPUTER | 20% |
| | RECORDS | 5% |
| | NAME | 1% |
| | . . . | . . . |
| GOLDEN | COLOR | 40% |
| | DOG | 20% |
| | CITY | 10% |
| | NAME | 5% |
| | BRIDGE | 3% |
| | . . . | . . . |

| PHRASES — 62 | CATEGORY — 64 | USAGE — 66 |
|---|---|---|
| GOLDEN GATE (64a) | BRIDGE | 60% |
|  | UNIVERSITY | 25% |
|  | COLOR | 10% |
|  | . . . | . . . |
| GOLDEN GATE BRIDGE (64b) | BRIDGE | 80% |
|  | COLOR | 10% |
|  | . . . | . . . |
| GOLDEN GATE BRIDGE PANTONE (64c) | COLOR | 30% |
|  | BRIDGE | 60% |
|  | . . . | . . . |

METHOD AND SYSTEM FOR QUALIFYING KEYWORDS IN QUERY STRINGS

CROSS-REFERENCE TO RELATED APPLICATIONS

This application is related to and claims the benefit of U.S. Application Ser. No. 60/807,421, filed Jul. 14, 2006, inventor Scott A. Jones, et al., titled METHOD AND SYSTEM FOR QUALIFYING KEYWORDS IN QUERY STRINGS, and U.S. Application Ser. No. 60/824,394, filed Sep. 1, 2006, inventor Scott A. Jones, et al., titled METHOD AND SYSTEM FOR QUALIFYING KEYWORDS IN QUERY STRINGS, in the United States Patent and Trademark Office, the disclosures of which are incorporated herein by reference. This application is a continuation of U.S. application Ser. No. 11/777,505, filed Jul. 13, 2007, inventor Scott A. Jones, et al., titled METHOD AND SYSTEM FOR QUALIFYING KEYWORDS IN QUERY STRINGS.

BACKGROUND

1. Field

The present invention is directed to a search tool and, more particularly, to a method and system for qualifying keyword(s) or phrase(s) to formulate a query for submitting a search request. The qualification of the keyword(s) or phrase(s) may be used to identify and select providers, resources, advertisements, and/or results.

2. Description of the Related Art

Generally, users who want to locate information on the Internet submit a search request to information resources such as search engines and retrieve desired information from results returned from the search engines in response to the request. Typically search engines are keyword-driven applications searching for information content indexed in a database as containing keyword(s) specified in the search request submitted by a user and return web pages containing the specified keyword(s). Due to the vast amount of information available on the Internet, relevancy of results returned from search engines are highly dependent on a query or keyword(s) formulated by a user seeking for information. However, current search engines and other similar information resources offer inadequate or no assistance to users in formulating a query to better optimize results, thus requiring the users to repeat searches and browse through returned results in order to locate relevant information.

Technologies have been developed in an attempt to better assist users in seeking information on the Internet, such as specialized search engines searching information of a particular subject area or type of data, meta search engines such as Jux2, Dogpile®, etc., submitting a query to multiple search engines, Internet directories categorizing links to various web sites, etc. However, searches using these and other similar technologies require users, especially those without knowledge of a specific uniform resource locator (URL) or features of an information resource, to browse through contents of web pages to locate desired information and do not provide support in formulating keyword(s) or phrase(s) for a search to assist the users in increasing the probability of accurate results.

The ability of current search technologies to find information depends on indices of information that can be queried for a keyword specified by a user and often causes large numbers of non-relevant results to be returned to the user especially when the keyword has more than one meaning. As such, results returned from search resources are often limited by the quality of a request submitted by the user. For example, if a user submits, "what is the best selling apple product?" as a query for a search, the keyword "apple" may be queried to retrieve data pertaining to the fruit, products of the Apple® computer company, products of the Apple® record label, etc., due to various meanings that may be associated with the keyword "apple".

In addition, when a keyword that has various associated meanings is contained in a query, advertising information provided is often non-relevant to the meaning of the keyword desired by a user submitting the query. Using the same example as above, when a user submits, "what is the best selling apple product?" as a query for a search, advertising information pertaining to products of the Apple® computer company are often provided although use of the keyword "apple" in the query may be meant to refer to the fruit.

Searching for desired information using typical information resources can be particularly time consuming for users of portable devices such as cellular phones, a personal digital assistant (PDA), etc., which have limited display and input capabilities because current information resources require users to frame queries without assistance and view contents of a broad list of web sites to obtain desired information from search results returned by the information resources.

Although various search tools such as search engines, Internet directories, etc., are available, there is no known way of accurately and efficiently qualifying keyword(s) or phrase(s) for formulating or re-formulating a query to conduct a search.

SUMMARY

A system and method are disclosed to identify a meaning of a keyword based on use of the keyword in search requests and results thereof and display the identified meaning when the keyword is contained in a subsequent query string.

The system and method include tracking associated meanings of a keyword in relation to a search and qualifying the keyword in response to a selection from a list of meanings of the keyword when the keyword is contained in a query.

An interface is disclosed for prompting a user to qualify a keyword or phrase while the user is formulating a query for a search. An interface is disclosed for prompting a guide or provider to qualify a keyword or phrase after a user has submitted a query for a search.

The system includes categorizing a keyword or phrase based on meanings associated therewith, storing usage information of the categorized keyword or phrase in accordance with corresponding use of meanings associated with the keyword or phrase and prompting a user to qualify the keyword or phrase while the user is formulating a query containing the keyword or phrase. The disclosed system is used to more precisely target providers, resources, advertisements and/or results, including selecting advertisements to be delivered to users and/or providers in a highly targeted way.

The system and method may use an entire current query (which may require a user or a guide to categorize the query) and/or an entire previous query(ies) (which may have been categorized by one or more previous guides and/or users) as a basis for prompting a user and/or guide to generate a search query. A more detailed and/or less ambiguous query may produce a more precisely targeted search result(s), advertisement(s) and/or resource(s) for the user and/or provider. As a result, a user and/or guide may be able to form a more specific query which can produce his or her desired information without requiring review of search results and/or repetition of the search with a modified or similar query.

As the database of search queries, results, advertisements, results and associations among them increases the ability to create a highly targeted search query using the system, method, interfaces and tools described herein may be enhanced.

These, together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a block diagram of a system for qualifying keywords and phrases for searches.

FIG. 3 is a table illustrating a relationship between keywords, associated categories and usage of the keywords.

FIG. 4 is a table illustrating a relationship between phrases, associated categories and usage of the phrases.

DETAILED DESCRIPTION OF THE PREFERRED EMBODIMENTS

Figure 1A:
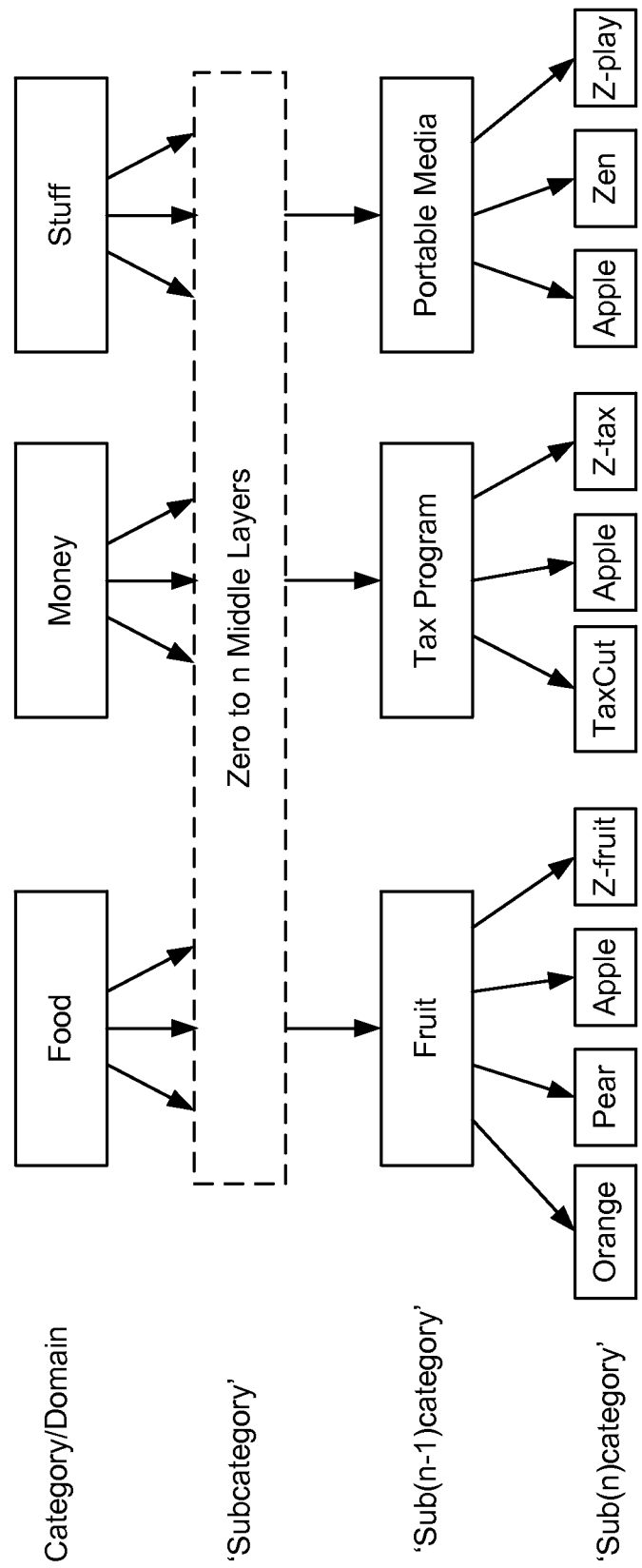
FIG. 1A is an exemplary tree illustrating categorization and/or sub-categorization of keyword(s).

Reference will now be made in detail to the present embodiments discussed herein, examples of which are illustrated in the accompanying drawings, wherein like reference numerals refer to the like elements throughout. The embodiments are described below to explain the disclosed system and method by referring to the figures. It will nevertheless be understood that no limitation of the scope is thereby intended, such alterations and further modifications in the illustrated device, and such further applications of the principles as illustrated therein being contemplated as would normally occur to one skilled in the art to which the embodiments relate.

The disclosed search tool for qualifying keyword(s) and/or phrase(s) assists a requester (also variously known as a ChaCha® user, user, information seeker, or Infoseeker™) and/or a provider (also variously known as a ChaCha® guide, guide, paid searcher, searcher, or PaidSearcher™) in structuring a query string for a search and thereby optimizes search results returned. Similar methods may also be used in traditional search environments where there is only a requester or user of a search engine (and no provider). A requester may be an individual person, a system, or an entity, etc., submitting a request seeking information for the requester or on behalf of another person, organization, entity, etc. A request is a query or keyword(s) submitted to seek information and may entail a fully formed question, sentence, keyword(s) or phrase(s), or any other type of query. A provider is a human searcher who has registered to accept requests and may be a professional, an amateur and/or volunteer searcher.

FIG. 1 illustrates an exemplary system 20 for qualifying keyword(s) and/or phrase(s) to be submitted for a search. The system 20 includes system manager (server) 26 managing requests from requesters submitted using devices 22 such as computer 22a, handheld device 22b, mobile phone 22c or landline phone 22d, or any other network enabled device(s) via network 24 and delivering result(s) and/or status information associated with requests from provider systems 28 via network 24a. The requester devices 22 may be any text- or speech-based device using which a request may be submitted to system manager (server) 26 via the network 24 and the provider systems 28 may be connected to the system manager (server) 26 via the network 24a or other network(s).

The requests from the requester devices 22 may be submitted via system manager (server) 26 to provider systems 28 for executing a provider assisted search via network 24a, or may be processed by the system manager (server) 26 which would return results to the requester devices 22 based on stored information in database 30. For ease of explanation, only a few provider systems 28a through 28c used by providers and requester devices 22a through 22d used by information seekers are illustrated in FIG. 1; however, the present invention is not limited to any particular number of requester and/or provider systems. For example, at any given time, the system 20 may have hundreds or thousands of provider systems 28 available to accept requests and deliver results to various requesters, e.g., via requester devices 22. Similar to the requester devices 22, the provider systems 28 may be any text- or speech-based systems such as a desktop or laptop system, a handheld device such as a personal digital assistant (PDA), a cellular telephone, or any other device that allows a provider to receive, accept and/or fulfill requests submitted by requesters via text or speech entry.

When a requester opts to conduct a search without a provider(s)' (or guide(s)') assistance, a query of the requester may be submitted to resource(s) such as search engines, Internet directories, etc., associated with that request for provider(s) registered to accept requests associated with the subject matter of the query. The resource(s) may be supplied to the requester based on various factors such as subject matter, category(ies) and keyword(s) of the query, use of the resource(s) by provider(s) for one or more previous searches with category(ies) or keyword(s) related to the query, resource(s) selected by system administrator(s) or expert provider(s) selected by the system administrator(s) as being most likely to produce relevant results, etc. Alternatively, a requester opting to conduct a search without provider assistance may be provided with information stored in the database 30 such as response(s) to previous request(s), data gathered by provider(s) for responding to request(s), etc., which may be utilized to produce automated results in response to a request by the requester. For example, a provider associated with a particular subject matter may memorialize information pertaining to the subject matter, which in turn may be provided as automated result(s) to a requester opting to conduct a search without provider assistance.

The system manager (server) 26 connected to the database 30 is connected to sources 27 and provider systems 28 via the network 24a. The network 24 and the network 24a of the system 20 may each be a global public network of networks (the Internet) or consist in whole or in part of one or more private networks. The sources 27 and provider systems 28 may be directly connected to the system manager (server) 26. The database 30 may maintain a record of meaning(s) or form(s) of keyword(s) and phrase(s) including category(ies) associated with a meaning or form, request(s) associated with the keywords and phrases including result(s) generated in response to the request(s), usage of associated meaning(s) or form(s) of any keyword or phrase including categories thereof, etc. Further, provider(s) and/or requester(s) may be doing the qualification of keyword(s), depending on the implementation.

The database 30 illustrated in FIG. 1 is not limited to maintaining any particular type of information related to keywords or phrases used in requests or responses exchanged via the system 20 and may contain statistical data, such as a histogram which may indicate what keyword(s) or phrase(s) are associated with any of several categories that may be identified by the system 20. For example, the database 30 may maintain a histogram of usage for multiple meanings and/or forms of keyword(s) or phrase(s) which may be used to prompt a requester and/or provider to qualify or clarify keyword(s) or phrase(s) having multiple meanings or forms when formulating a search query. A histogram of usage of keywords and phrases may be maintained in the database 30 for determining the order in which a display of meanings, categories and/or forms associated with keyword(s) or phrase(s) are presented to a requester and/or provider. Further, a default meaning and/or form of a keyword or phrase may be determined based on a histogram of usage where the most frequently used meaning and/or form of a keyword or phrase may be presented first and remaining meaning(s) and/or form(s) for the keyword or phrase are ranked based on frequency of usage of the meaning(s) and/or form(s) by requesters and/or providers. How meanings, categories and/or forms of keywords and phrases are displayed by the system 20 for qualification is explained in detail below with respect to FIGS. 5 and 6, respectively.

The system 20 (FIG. 1) may also determine the possible category(ies) or sub-category(ies) of the keyword(s) in a query. Based on this collective information, possibly combined with individual keyword histograms, a "most likely" category of the entire query string may be hypothesized by the system 20 (FIG. 1). In other words, if several keywords in a query string were related to basketball, even if some of the keywords had ambiguous meanings, the system 20 (FIG. 1) may make a "best guess" that each keyword should be assumed to have meaning within the basketball context.

The database 30 may also maintain information associated with success of the providers (e.g., relevance of the results to the end user), number of advertisements presented while the providers are fulfilling queries, advertisements hand-selected by the providers, the speed of response of the system, the provider(s) and other resources, etc. For example, the system manager (server) 26 may compute the number of times an advertisement has been presented, the length of time a requester viewed an advertisement, whether a requester "clicked through" an advertisement, whether a requester bought products and/or services from an advertiser's website (this information may be delivered back to the system manager (server) 26 from an advertiser), etc.

FIG. 1 illustrates the database 30 as a separate component of the system 20; however, the database 30 may be integrated with the system manager (server) 26. Further, the records maintained in the database 30 may be stored in any conventional manner, including in a Network Attached Storage (NAS), a Storage Area Network (SAN), etc., using any conventional or proprietary database software such as DB2®, Informix®, Microsoft® SQL Server™ MySQL®, Oracle®, etc. The information maintained in the database 30 is explained in detail below with respect to FIGS. 3 and 4.

The system manager (server) 26 of the system 20 communicates with sources 27 via network 24a. The sources 27 may be private and/or public databases supplying information pertaining to meanings, categories and/or forms related to keywords and/or phrases and may include any source(s) containing information on usage, translations and/or other items related to meaning(s) and/or form(s) of keywords and/or phrases. In addition, the sources 27 may supply information pertaining to meanings, forms, categories, etc., of keywords and/or phrases in real-time or provide such information via database dump in a snail mail, for example. Although FIG. 1 illustrates sources 27 communicating with the system manager (server) 26 via the network 24a, the present invention is not limited to sources accessible only via the network 24a. For example, meanings or forms of particular keywords and/or or phrases may be supplied to the system 20 from experts in an industry most knowledgeable of the particular keywords or phrases, a private database of an experienced provider, an application providing definitions of words or phrases, or any other source having information pertaining to meanings or forms of keywords or phrases such as general and specialized (e.g., technical) dictionaries relating to specific subject fields, including sources such as DMOZ, Zeal® (from LooksMart®), Wikipedia®, Trellian®, etc.

As is typical in the search industry, the majority of search queries may contain a single word, and more than 80% of queries contain less than 4 words. This is partially due to the algorithm design of search engines such as Google®, as described in *The Anatomy of a Large-scale Hypertextual Search Engine* by Brin, et al. These engines are designed to produce 'reasonable results' from a short query such as "Bill Clinton". Such engines may provide more sophisticated users with a Boolean search option, or other more complex methods of forming perhaps more targeted queries.

Subsequent to completing a search, some search engines may suggest alternate or more specific queries to a user based on statistical (or other) popularity of query phrases that may contain any or all of the keywords in the original query.

In at least one embodiment, the entire content of a query phrase may be a keyword. Because human judgment (a guide/ searcher and/or a user/infoseeker) is available to determine the meaning of a keyword, it may be advantageous for an entire query to be a keyword. The use of the entire query as a keyword may allow for more effective use of techniques such as fuzzy matching to select a "most likely" intended meaning(s) of a query phrase which can be presented to a guide or a user for clarification. A 'top down' method may produce a more effective use of the methods described herein as it may allow a guide and/or user to determine an intended meaning of the totality of a query thereby allowing the association of a meaning(s) or form(s) with the entire query, or any part(s) thereof.

Figure 9:
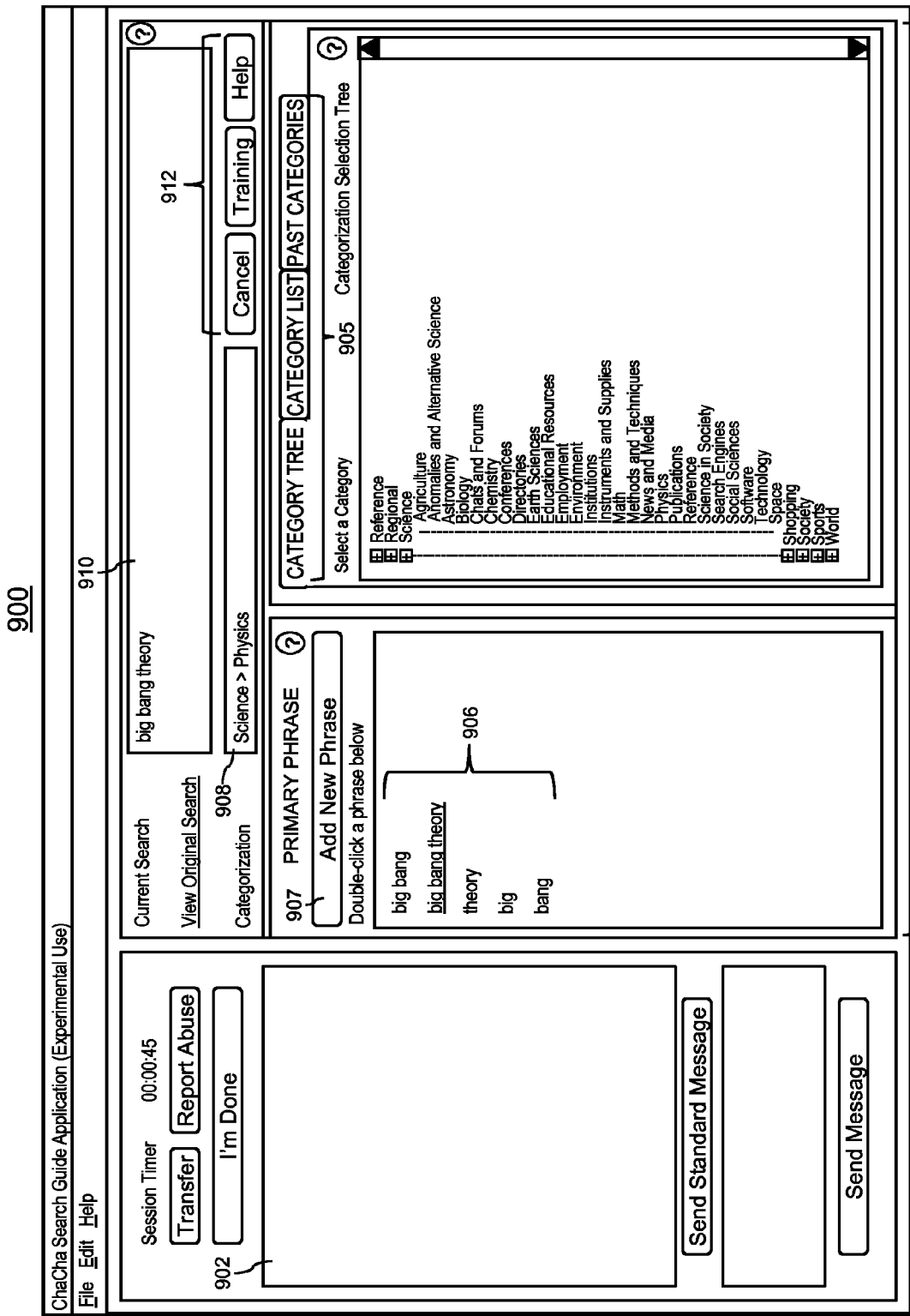
FIG. 9 is an exemplary GUI presented to a provider or guide to aid in qualifying keywords.

For example, as described in greater detail with respect to FIG. 9, a guide may add a keyword(s) to an original query based on interaction with a user to attempt to clarify a query. A meaning for a query may be identified, and a modified query and/or the original query may be associated with a keyword (s), category(ies), subcategory(ies), tag(s), etc.

Using the example illustrated in FIG. 9, a guide might add the keyword "evidence supporting" to the original query "big bang theory". The guide might associate the new keyword with the category "Science>Astronomy". Alternately, the guide might add the keyword "rock band" to the original query phrase and associate the new keyword with the category "Arts>Music". The more specific keyword might be stored as a new keyword in the database 30 (FIG. 1). Subsequently, the search system might receive a query such as "is there evidence supporting big bang theory", and a fuzzy match of the query against the keywords "rock band big bang theory" (categorized as "Arts>Music") and "evidence supporting big bang theory" (categorized as "Science>Astronomy") could be correctly associated with the more correct category "Science>Astronomy", which may improve selection of guide(s) and/or resources and/or targeting of advertisement(s), etc. If the keyword "big bang theory" is used for the matching process both "Arts>Music" and "Science>Astronomy" might be matched to the query. Process(es) using more specific keyword(s) (e.g., "evidence supporting big bang theory") may provide a more effective selection of guide(s) and/or resource(s) and/or targeting of advertisement(s), etc.

In a preferred embodiment, the present invention is used with the system discussed in U.S. patent application Ser. No. 11/336,928, titled A SCALABLE SEARCH SYSTEM USING HUMAN SEARCHERS, inventor Scott A. Jones, filed Jan. 23, 2006, the disclosure of which is incorporated herein by reference, or other similar search systems. In addition, when the requester devices 22 submit requests to the system 20 for provider or guide assisted searches, a desired meaning of keyword(s) in the requests may be determined so that provider(s) best suited for the requests can be accurately chosen along with particular search resources and targeted advertisements. This also gives the best opportunity for returning the best results to the user. Said another way, a qualified keyword (as determined automatically, qualified by a requester, and/or qualified by a provider) can be used to identify and/or select guide(s), resource(s), result(s), and/or advertisement(s).

FIG. 1A is an exemplary tree illustrating category/domain of keyword(s) and phrase(s). As shown in FIG. 1A, the taxonomy may be in a form of a Bernoulli tree that has the lowest level, a "leaf" of the tree, as a keyword or keyphrase. The terms keyword and keyphrase are interchangeable. Keyphrase generally refers to a group of natural language words, such as "NBA Basketball" and keyword generally refers to a single word "basket" or "ball." Accordingly, the larger the taxonomy is, the greater the specificity of the keyword and/or phrase.

In situations where there is no guide (or provider) assigned to a particular "leaf", groupings of leaves may be established to allow suitable guides to be found for assisting with a request containing the particular "leaf". For example, when fewer guides are registered to the system 20 (FIG. 1) than the number of leaves, groupings of leaves may be established such that guide(s) are able to assist with requests containing any of the keywords and/or phrases existing in the system 20. The grouping of leaves is not limited to any particular rule and may be accomplished using thesaurus synonyms, usage commonality, semantics, etc. In general, a grouping of keyword(s) may be referred to as a domain, category, subcategory, etc. The name designating the groupings of keywords and/or phrases may vary as the size of a grouping increases or decreases. For example, groupings may be aggregated into larger groupings (i.e., category as a group of subcategories, domain as a group of categories, etc.) as the number of groupings in the system 20 (FIG. 1) increases and the naming and/or the number of levels in the Bernoulli tree may change to accommodate a greater number of leaves and make the taxonomy more effective.

A guide assigned to a particular, unique "leaf" may be rare when the number of guides registered to the system 20 (FIG. 1) is much less than the number of keywords. For example, a taxonomy may have 2 million keywords, but only 2,000 guides with 20,000 keywords. When a query is matched to a particular keyword that does not have a guide assigned, the system 20 may determine a "generalist" who can answer the query. For example, the system 20 may look for guide(s) assigned to keywords which are part of the next higher level in the tree such as a sub-category, sub-sub-category etc., and notify such guide(s) regarding the query. If no guide is found at the first level of the tree above the "leaf", the system 20 may proceed upward until the top level of the tree is reached. Accordingly, a larger number of levels in the tree allows for smaller, and thus more specific, generalization.

As explained throughout the disclosure, categorization of a keyword or phrase illustrated in FIG. 1A is dynamic. For example, as new meaning(s) are developed for a keyword, the keyword (for example, "apple") may be a "leaf" of the tree in many locations since the keyword is a "leaf" of multiple categories, such as "computer", "fruit", "search engine", "tax program", "record company", etc. As explained in detail below, the qualification of a keyword assists the system 20 (FIG. 1) to find the intended contextual meaning of a query submitted by a requester.

When a query from the requester devices 22 is submitted, for example, for a search without assistance from a provider (or guide) and the query is passed to search engine(s), advertisement(s) associated with the query may be selected based on keyword histogram(s) in the database 30 (FIG. 1) that "best fit" the query and these advertisements can be presented to the user (or requester). When search result(s) from the search engine(s) are returned, before providing them to the user, they can be sorted based on the keyword histograms. For example, when a user requests information about "apple", if the histogram for the keyword "apple" indicated that Apple® computer company was the most probable subject of the query rather than say the fruit apple, advertisement(s) for Apple® products can be presented to the user and search results can be sorted to show search results from www.apple.com first.

Figure 2:
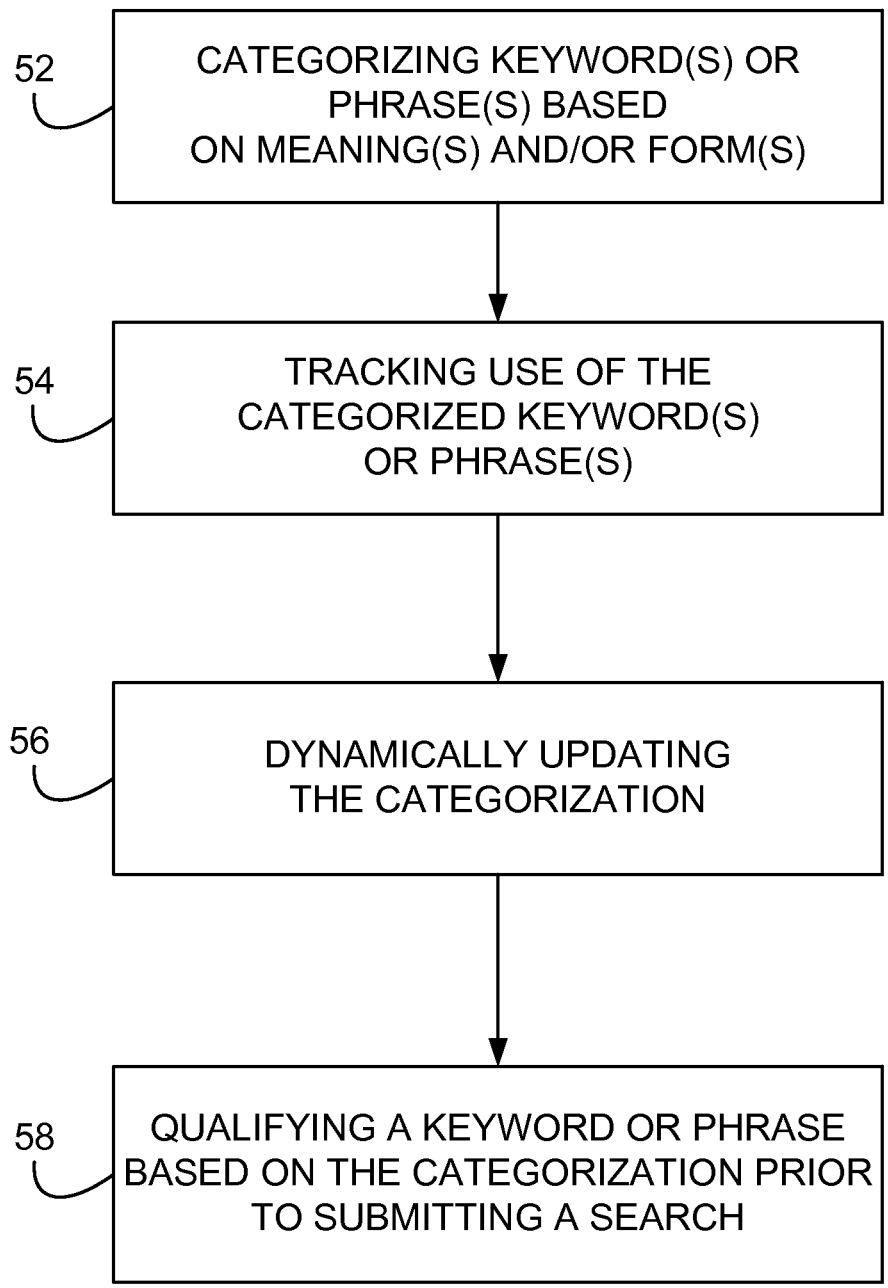
FIG. 2 is an exemplary flowchart illustrating qualifying of a keyword or phrase.

An exemplary process 50 for qualifying keyword(s) or phrase(s) is illustrated in FIG. 2. As shown in FIG. 2, process 50 begins with categorizing keyword(s) or phrase(s) 52 based on meaning(s) and/or form(s). As previously discussed, a request may be any combination of keyword(s) or phrase(s) pertaining to which a requester or provider is seeking specific or general information. For example, a requester may submit a search request directed to the keyword "apple", or pertaining to the search phrase "who runs the apple computer company?".

The categorization 52 includes determining meaning(s) associated with keyword(s) or phrase(s) and associating each meaning of the keyword(s) or phrase(s) with a category or subject matter. Further, based on determination of the categories associated with each of the keywords in a query, the "best" category for the keywords may be determined. For example, a particular combination of keywords in a query may result in a determination that the query is directed to the category pertaining to "basketball" while a different combination containing some of the same keywords may result in a determination that the query is directed to the category "health". For example, the system 20 (FIG. 1) may determine that the query "Reggie Miller free-throw clinic by Nike" is directed to the category "basketball", while determining the query "clinic for avoiding Miller Time by Alcoholics Anonymous" to be directed to the category "health." This may provide a "default" categorization, at which point the system 20 (FIG. 1) may allow a user or guide(s) involved with a search to change the categorization of one or more keywords. Further, a guide (or provider) receiving a query may choose to transfer the query to another better-suited guide based on a new categorization of a keyword.

Using the same example discussed above, a search query associated with the keyword "apple" submitted by a requester may be intended to mean, the computer company, the fruit, a person's name, Adam's apple, the record label, etc. The categorization 52 includes classifying the keyword "apple", for example, with the computer company, the fruit, a person's name, Adam's apple, the record label or any other category maintained in the database 30 (FIG. 1). The system 20 may utilize assembly language and/or language processing technologies such as word root matching, fuzzy logic, etc., to handle meanings associated with variations of keywords. The categorization or classification of keywords including phrases containing the keywords in the database 30 (FIG. 1) may be obtained from external source(s) such as Internet directories (e.g., DMOZ), online dictionaries and/or encyclopedias (e.g., Webopedia, Wikipedia®, etc.) or other similar sources. For example, a requester or provider may be prompted to qualify keyword(s) contained in a query based on taxonomy utilized by DMOZ.

Subsequent to categorizing 52, process 50 continues by tracking uses 54 of the categorized keyword(s) or phrase(s) associated with requests and/or responses returned by the system 20 (FIG. 1). Tracking use 54 of the keyword(s) or phrase(s) includes determining whether new meaning(s) have been associated with a keyword or phrase, whether use(s) of keyword(s) or phrase(s) maintained in the database 30 (FIG. 1) have changed, or any other factor that may affect categorization 52 of the keyword(s) or phrase(s) based on associated meaning(s) and/or form(s). For example, over time, a new category and/or subcategory may become associated with the keyword "apple" (e.g., a new product, company, etc.) and the existing associations of a particular keyword or phrase may be modified, etc. Tracking uses 54 of the categorized keyword(s) or phrase(s) may include capturing a new categorization developed in association therewith and/or inserting new associations among the keyword(s) and/or phrase(s) and other related categories. This may occur via batch database updates from sources such as Trellian®, DMOZ, or other various sources or it may occur from manual association of category(ies) to keyword(s) and/or phrase(s). The system 20 (FIG. 1) may also capture information pertaining to modification and creation including date, time, identity of who made a modification, etc. Weighting of the old and new categorizations may also affect ranking of the relative categorizations including how meanings and/or categories of keywords or phrases are displayed by the system 20 (see FIGS. 5 and 6).

If a change has occurred with respect to the categorization of a keyword and/or a phrase based on tracking 54, process 50 dynamically updates 56 the categorization. If the tracking 54 identifies a change in categorization of keyword(s) or phrase(s) due to a new meaning associated with a keyword(s) or phrase(s), change of an existing meaning associated with a keyword(s) or phrase(s), etc., the database 30 (FIG. 1) is dynamically updated 56 to indicate the change. For example, a web based application configured using Asynchronous JavaScript® and XML (e.g., using Ajax) may be used to implement changes to a category associated with keyword(s) or phrase(s) which may result in updating a corresponding category of keyword(s)/phrase(s) in accordance with the tracking 54 without reloading a web page in its entirety or directing a requester or provider to another page. Additionally, a guide (or provider) may identify new categorization(s) while providing search services to a user (or requester) from within an interface or tool, etc. provided to the guide via the system 20 (FIG. 1). When a search session has completed, alternate associations between the keywords in the query and category(ies) may be identified. These may be treated as changes in association between keyword(s)/phrase(s) and category(ies).

A provider may be able to update or request changes to meanings, forms, or categorization of keyword(s) and/or phrase(s) based on, for example, an approval or authorization by the system 20 (FIG. 1). For example, individual providers may be approved to update keyword(s) related to a subject matter within the provider's expertise, based on discovery of a new meaning of a keyword associated with a particular category, etc. Also, a provider or requester may be permitted to submit updates to categorization of a keyword based on experience as a guide (e.g., a veteran guide), knowledge of a particular category or industry, etc., obtained in other ways. A few examples are provided below where a requester and/or provider may be approved to update categorization of a keyword or phrase; however, the present invention is not limited to a particular criteria so long as legitimacy of the update can be verified by system administrator(s) of the system 20 (FIG. 1). Alternatively, the "wisdom of crowds" may be used to keep keyword categorization up-to-date. For example, a process similar to the taxonomy and descriptions of Wikipedia®.

In addition, authorized providers and/or requesters may submit updates to meanings, forms, and/or categories of keywords and/or phrases based on data from sources 27 (FIG. 1) such as a dictionary, Trellian® database, or any other source of definition of word(s) or phrase(s), using which the system 20 may update the records maintained in the database 30. New keywords and/or phrases may be added to the system 20 (FIG. 1) via several modes including manual updates by administrators, new categorizations submitted via web-based interfaces, batch updates from various sources 27, updates from guides and other third party systems, that may be processed via tools such as database bulk data loaders, etc. These updates may be delivered by several means including FTP, e-mail, and web services. Preferably, an option for adding a new meaning or form may be presented to a provider (or guide) in the interface 70 (see FIG. 5). For example, an option to add a new meaning of a keyword may be provided via the interface 70 (FIG. 5) using which a veteran provider who has fulfilled search requests related to that keyword for at least a defined period of time may add a new definition, form or categorization associated with the keyword.

In addition, the disclosed system may use an approval process for adding a new definition or categorization to the database 30 (FIG. 1) where a provider is able to use new definition(s) for a search and may submit the new definition(s) for approval which places a request to add the new definition(s) in a queue for system administrators (who may also be authorized providers) to review and possibly add to the database 30. Authorized providers may also add categories to the database 30 (FIG. 1) that may be used for qualifying keywords and/or phrases. The system 20 (FIG. 1) may also maintain a record of who submitted a new definition and determine whether the new definition should be added to the system 20 (FIG. 1) automatically, for example, when an expert user or guide submits the addition, through review, a combination of these, etc. As mentioned above, the "wisdom of crowds" method may also be used to update keyword to category associations by allowing guides and/or users to update keyword(s) and their associated categorization(s).

When a new meaning associated with a keyword(s) is added to the database 30 (FIG. 1), an alert using electronic mail, an instant message, a popup window, etc. may be sent to a requester(s) who has signed-up with the system 20 (FIG. 1) to receive a notification when, for example, a new keyword pertaining to a category which the requester has previously searched is added and/or a registered provider(s) associated with the keyword that may provide the provider(s) with an opportunity to register for the new and/or newly qualified meaning of the keyword or phrase. The term "keyword" may include one or more words or phrases that can include multiple keywords as well as natural language sentences that can be analyzed to extract keywords. For example, if a new search engine named "apple" is developed, providers registered to handle requests associated with the keyword "apple" in one or more of the categories 44*a* (FIG. 5) may be alerted as to the new meaning associated with the keyword "apple" so that requests for information about the new search engine can be clarified and understood more easily. Providers registered for alternate categories for "apple" may not be expected to respond to the new "apple" category unless he or she registers for the new category for "apple".

After dynamically updating 56 the categorization, the process 50 (FIG. 2) qualifies 58 a keyword or phrase having multiple meaning(s) or form(s) prior to submitting a search. For example, a requester may be prompted to identify which of the meanings of the keyword "apple" the requester is using as the requester builds a search query for a search request. Similarly, if the keyword "golden" is entered into a query field and the keyword is associated with multiple categories, such as "golden gate bridge", the city of Golden, Colo., the color gold, etc., a requester may be prompted to identify which of the meanings associated with the keyword "golden" the requester is intending. Alternatively, a provider may be prompted to make an identification after a requester has submitted a query. Qualifying keyword(s) and phrase(s) for a search is explained in detail below with respect to FIGS. 5 and 6.

FIG. 3 is a simplified example of a relationship 40 among individual keywords 42, associated category(ies) 44 and usage 46 maintained by the database 30 (FIG. 1). The relationship 40 includes keywords 42 contained in requests submitted from the requester devices 22 (FIG. 1), responses delivered from the provider systems 28 in response to the requests and data related to the keywords supplied by sources 27 pertaining to the keywords 42. The meaning(s) or form(s) of the keywords 42 are associated with category(ies) 44. For example, the keyword "apple" contained in requests from the requester devices 22 and in responses generated by the provider systems 28 in response to the requests may pertain to categories 44*a* such as the fruit, the computer company, the record label, a person's name, etc. As another example, the keyword "golden" appearing in search queries submitted by requesters and/or in responses generated by the system 20 (FIG. 1) may be classified in various categories 44*b* such as the color gold, the dog golden retriever, the city of Golden, a person's name, golden gate bridge, etc.

The relationship 40 includes usage 46 data of the keywords 42 in association with each category 44 pertaining to the keywords 42. The usage 46 data may be based on use of a keyword by requester(s) in association with one or more of the category(ies) classified for the keyword, use of a keyword by provider(s) fulfilling request(s) in association with a particular category of the keyword, a ratio of the number of provider(s) registered for searches associated with a keyword who have used the keyword in association with a category compared to the total number of provider(s) registered for handling searches associated with the keyword, universal use of a particular category pertaining to a keyword, or any other method that determines usage. In the example illustrated in FIG. 3, use of the keyword "apple" to mean the fruit is 60% while use of the keyword in reference to the Apple® computer company is 20%. From the categories 44*b* pertaining to the keyword "golden", usage of the keyword "golden" in reference to the color is 40% and use of the keyword to mean a dog (e.g., a golden retriever) is 20%. The relationship 40 may indicate the number of requesters and/or providers using a category or meaning pertaining to a keyword. For example, the database 30 (FIG. 1) may maintain information relevant to the number of requesters who have submitted a search in relation to a particular keyword which may be provided to a requester inputting a query containing the keyword via GUI 70 of FIG. 5.

In addition, usage/hit count(s) per qualified keyword may be captured historically in the database 30 (FIG. 1). For example, active counters for various time periods (e.g., current calendar year, current calendar month, current week, a predetermined number of hours, etc.) may be provided where when the current time period has expired, a record is marked for archival, and a new record can be created. The new record may start the usage/hit count(s) from zero, or may provide weighted values from a previous period (e.g., halving the value of the previous period). Additionally, sets of counters may be collected based upon the identification of a primary qualified keyword/phrase of a query as well as for each unique keyword/phrase within the query (i.e., one query incrementing many keyword/phrase counters). The hit counts may be imported from other data source(s). For example, Trellian® aggregates data from several search engines to provide a categorized list of keywords along with associated hit counts.

FIG. 4 is an exemplary relationship 60 among multiple keywords or phrases 62, associated category(ies) 64 and usage 66 maintained by the database 30 (FIG. 1). Similar to the relationship 40 (FIG. 3) with respect to the keywords 42, the relationship 60 includes phrases 62 associated with search requests from requester devices 22 (FIG. 1), responses delivered from the provider systems 28 in response to the requests and data related to the phrases supplied by sources 27 (FIG. 1) pertaining to the phrases 62. Associated meanings of the phrases 62 are associated with category(ies) 64. For example, the phrase "golden gate" in a request from a requester or a response from a provider may pertain to the categories 64*a* such as bridge, university, color, etc., and the phrase "golden gate bridge" may be associated with the categories 64*b* including the bridge near San Francisco, Calif., a color, etc.

The relationship 60 includes usage 66 data of the phrases 62 in association with each of the categories 64 pertaining to the phrases 62. Similar to the usage 46 data of the categories 44 related to the keywords 42, the usage 66 data may be based on use of a phrase when requesters submit requests, when providers build responses to requests, accepted or universal use of a particular phrase to refer to something, etc. Further, as discussed above, relative usage, hit count(s) and/or other similar factors may be used instead of percentages. For example, use of the phrase "golden gate" to mean the bridge in California is 60% while use of the phrase "golden gate" in reference to the university in California is 25%. The Trellian® database (commercially available) may be used to seed the database 30 (FIG. 1) with hit count data, and the system administrators, veteran providers, etc. may subsequently update the database 30 (FIG. 1) by monitoring system traffic and/or may rely on downloading updates from a resource such as Trellian®.

Figure 5:
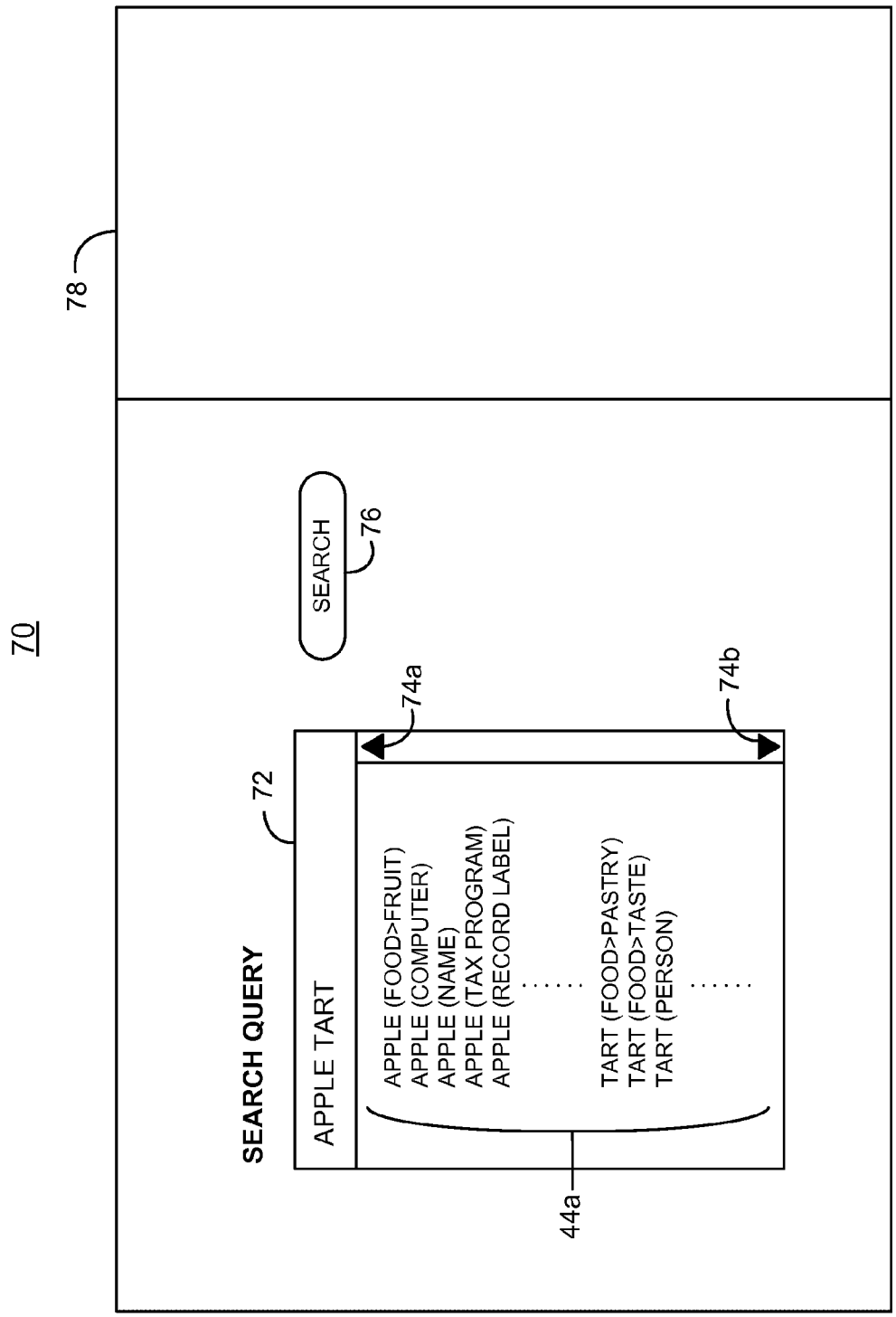
FIG. 5 is an exemplary graphical user interface (GUI) for qualifying keyword(s) in a query string.

FIG. 5 is an exemplary GUI 70 for qualifying keyword(s) in a query string to be submitted for a search. As shown in FIG. 5, the GUI 70 includes a search query field 72 enabling input of a search request identifying information sought, which may include keyword(s), phrase(s), a query, a fully formed question, sentence, etc. and a search button 76 for triggering a search based on the request entered in the search query field 72. For example, selecting the search button 76 may trigger a search pertaining to the keyword "apple". However, as illustrated in FIG. 3, the keyword "apple" may have multiple meanings that are associated with several categories maintained in the database 30 (FIG. 1).

The GUI 70 (FIG. 5) presents a requester with associated category(ies) pertaining to a keyword entered by the requester in the search query field 72 based on information of the keyword maintained in the database 30 (FIG. 1). For example, the categories 44*a* for the keyword "apple" are provided to a requester upon the requester's entry of the keyword "apple" in the search query field 72 for a search. As shown in FIG. 5, categories of a keyword may be presented in a drop-down menu which a requester may view using elements 74*a* and 74*b* to scroll up and scroll down, respectively through contents listed in the drop-down menu. Although categories 44*a* of the keyword "apple" are displayed in the GUI 70 using a drop-down menu scrollable via elements 74*a* and 74*b*, the present invention is not limited to any particular interface for providing associated categories of a keyword(s), for example, a pop-up window displaying at least one category of a keyword (when available) may be provided when a requester enters the keyword in the search query field 72. Alternatively, categories may simply be listed under each keyword with the default category highlighted. Optionally, a requester could select a new category. A provider may have any of these selection options as well.

When a provider registers with the system 20 (FIG. 1), the provider may identify categories, keywords, or an area of interest for which the provider is willing to accept search requests. Similar to the GUI 70 in FIG. 5 provided to a requester for qualifying a keyword(s), when a provider initially registers to the system 20 and identifies a qualified keyword and/or phrase, the provider may be presented with associated category(ies) of the keyword and/or phrase and be requested to choose there from for accurately identifying at least one category of the keyword and/or phrase to which the provider is referring.

The GUI 70 (FIG. 5) also includes advertisement frame 78 for displaying advertisement information that may be related to qualified meaning(s) of keyword(s) or phrase(s) including provider (or guide) selected real-time advertisements related to a category of the keyword(s) or phrase(s). Advertisers may also sign-up for qualified keyword(s) so that their advertisement(s) only display when the keyword(s) is targeted with its more specific meaning. This, for example, may prevent wasteful display of advertisement information that is incorrectly targeted. If not for this improved targeting advertisement, information pertaining to iPods® may be displayed when the keyword "apple" is qualified to mean products of the record company, or worse, for a query related to apple cider. However, if the keyword "apple" is qualified in more than one category, e.g., as "apple (computer company)", "apple (fruit)", "apple (record label)", different entities could register to have advertising displayed for the different qualified versions of the keyword "apple". Thus, the Apple® computer company may register to have iPod® advertisement(s) displayed when the keyword "apple" is used in a query related to computer companies [apple(computer company)], the Washington Apple Growers Association might register to have advertising for Red Delicious apples displayed when the keyword "apple" is used in a query related to fruits [apple (fruit)], and a Beatles memorabilia distributor might register to have advertising for vintage Beatles album covers displayed when the keyword "apple" is used in a query related to record labels [apple(record label)]. This will preferably result in each company's advertising being more directly targeted to persons who might have an interest in their products and/or services.

Information provided via the advertisement frame 78 may include video, audio, music, games, web links, etc. that may interact with and is preferably displayed to a requester and/or provider while the search is being performed and may continue after the search results are displayed. Alternatively, information provided in the advertisement frame 78 may be chosen by the system manager (server) 26 (FIG. 1). For example, the system manager (server) 26 may select information to be supplied to the advertisement frame 78 based on a time of day, an estimated time for completion of a search, etc. In any event, being able to link an advertisement to a qualified keyword will likely prove extremely valuable to advertisers.

Moreover, resource(s) such as search engines, Internet directories, and/or any searchable or non-searchable website may be associated with meanings of keyword(s) contained in a query. The guides (or providers) registered in the system 20 (FIG. 1) may associate resource(s) with qualified keyword(s). For example, www.apple.com may be associated as a resource for the keyword "apple" when the keyword is used to mean the computer company, while www.applecorps.com may be associated with the keyword as a resource when the keyword is used to mean the record label. This has the benefit of targeting the search resources toward the actual intention of the query, which should provide much more relevant results to the user (requester) and/or guide (provider). The advertisement information displayed in the advertisement frame 78 may also be updated to correspond to search results generated in response to queries and new advertisement(s) may be displayed prior to delivering these results or alternately, concurrently to delivering the results.

Preferably, in the case of a new meaning or category being associated with a keyword or phrase, a mandatory sign-up procedure may be implemented by the system 20 (FIG. 1) identifying a provider as being registered for a multiple-meaning keyword (e.g., upon login to the system or when conducting a subsequent search) and prompting the provider to choose from the multiple meanings of the keyword by displaying, for example, the drop-down list of categories illustrated in FIG. 5.

A keyword(s) and/or phrase(s) may be modified based on secondary data associated with a requester and/or a provider. For example, information identifying (i.e., area code, GPS, IP address, cookie, etc.) requester devices 22 (FIG. 1) and/or provider systems 28 may be used to augment queries such as "the YMCA", "our house", "a local bar", etc. Although exemplary secondary data is discussed, the disclosed method and system are not limited to any particular data using which a keyword or phrase may be qualified. For example, a user 'cookie' might help to qualify or change the ranking of qualified meanings of keywords which are typically skipped like "me", "here", "at home", "my school" or "the King". In addition, information particular to a requester or provider may be used to locate a suitable provider(s) and/or resource(s).

Figure 6:
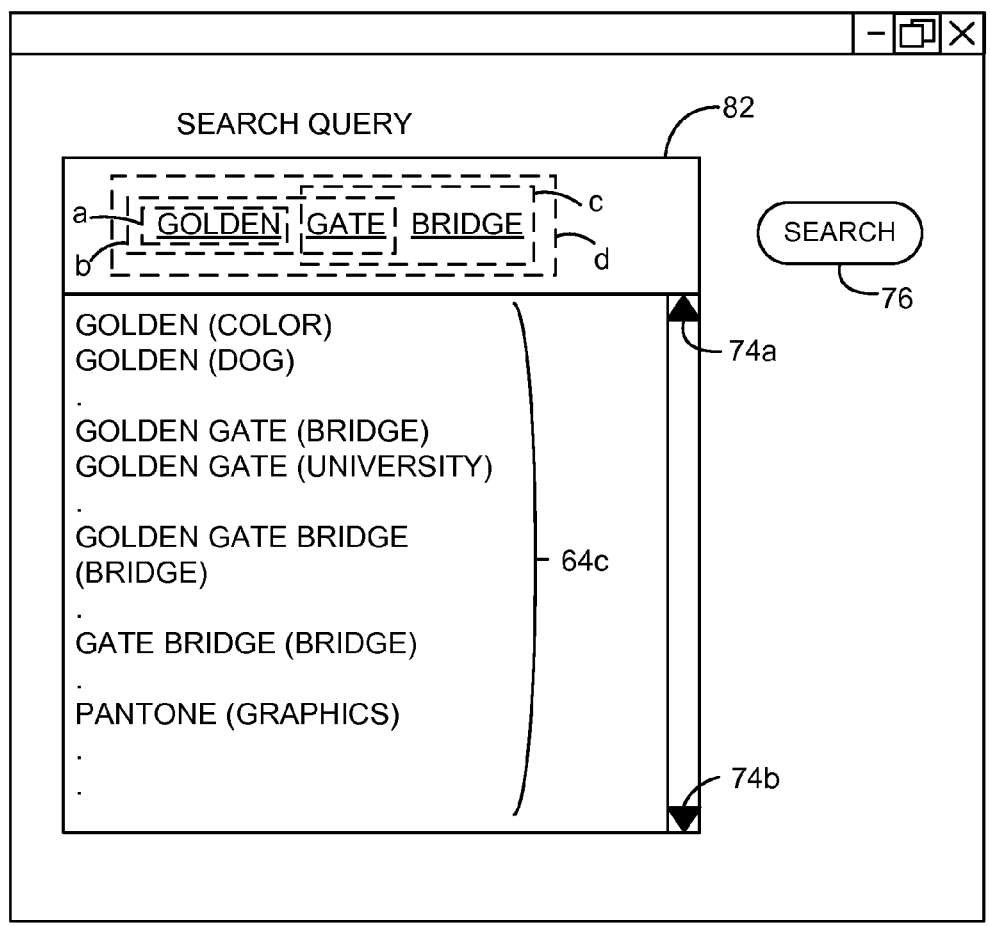
FIG. 6 is an exemplary GUI for qualifying phrase(s) in a query string.

FIG. 6 illustrates a GUI 80 for qualifying a phrase(s) in a query string. Similar to GUI 70 in FIG. 5, the GUI 80 includes a search field 82, enabling input of a request identifying information sought, and a search button 76, for triggering a search. As shown in FIG. 6, categories 64*c* associated with the phrase "golden gate bridge" are provided in a list which a requester or provider may select from to accurately formulate a search phrase for the search. In addition, when a requester has keyed in a query in the search field 82, the GUI 80 identifies each keyword forming the phrase that is known in the system 20 (FIG. 1). For example, the solid underlining corresponding to the keywords "golden", "gate", "bridge", indicates that each of the underlined words is identified as a keyword in the database 30 (FIG. 1). For example, as shown in FIG. 6, the keyword "golden" is associated with the category (color) and with the category (dog), the keyword "golden gate" is associated with the category (bridge) and the category (university), the keyword "golden gate bridge" is associated with the category (bridge), the keyword "gate bridge" is associated with the category (bridge) and the keyword "pantone" is associated with the category (graphics). However GUI 80 is not limited to displaying or presenting categories and/or meanings of keyword(s) or combination of keywords using a particular indication. For example, a solid underline bar may be indicated underneath various keywords and/or combinations of keywords contained in a query based on meanings and categories stored in the database 30 (FIG. 1). Accordingly, using the example of the phrase "golden gate bridge", solid underlines (or other indicators) may be provided for "golden", "gate", "bridge", "golden gate", "gate bridge", "golden gate bridge", etc.

The GUI 80 may indicate keyphrases forming the search string in the search field 82 that are identified by the system 20 (FIG. 1). For example, as denoted by the dotted lines a, b, c, and d in the search field 82, the GUI 80 indicates that phrases "golden", "golden gate", "gate bridge", and "golden gate bridge", are identified as keyphrases in the database 30 of the system 20 (FIG. 1). When a requester selects one of the phrases a, b, c or d as the subject of the search, the GUI 80 may provide corresponding category(ies) associated with the selected keyphrase. When, for example, the requester selects the phrase "golden gate bridge" by clicking on the phrase identified with the dotted line d, a list of the categories 64c maintained in the database 30 (FIG. 1) associated with the phrase "golden gate bridge" are presented to the requester for selection. Categories might include "bridge", "travel", "San Francisco", "sights", etc. In addition, any of these keywords could be chosen as the primary keyword. The keyword could then be qualified by category. By so doing, provider or guide resources, advertisements, and results can be better targeted.

The interfaces illustrated in FIGS. 5 and 6 may be implemented using an interactive web-enabled application configured using Ajax to generate Java® scripts. As such, selection by a requester of qualifying keywords or phrases of a search string may be implemented without requiring a web page provided for submitting a search to be reloaded upon the requester's selection from categories presented as associated with the keyword(s) or phrase(s). For example, when categories 44a (or 64c) are displayed to a requester and/or a provider as shown in FIGS. 5 and 6, an XML HTTP GET request may be sent to the system manager (server) 26 (FIG. 1) requesting information in the database 30 pertaining to keyword(s) or phrase(s) being qualified. Further, FIG. 6 may display all keywords and phrases in a query string. For example, a list of related meanings and/or categories of keywords including "golden (color)", "golden gate (university)", "gate bridge (bridge)", "golden gate bridge (bridge)", etc., may be provided via the GUI 80 illustrated in FIG. 6. The list illustrated in FIG. 6 is not limited to any particular meaning(s) and/or category(ies) of keyword(s), for example, may include "pantone (graphics)" or other related meanings and/or categories.

An order in which a list of categories 44a or 64c in FIGS. 5 and 6, respectively are presented may be based on frequency of use corresponding to the keyword(s) or phrase(s) in requests and/or in responses returned in response to the requests. For example, because the percentage of use of the keyword "apple" to mean the fruit is higher than the percentage of use of the keyword "apple" as the computer company, the category "fruit" may be given precedence in the listed categories 44a (FIG. 5). Data of usage of a particular keyword or phrase may be determined based on various factors including but not limited to number of hits calculated for use of a particular meaning of a keyword or phrase when a search query is submitted, number of results returned for a particular meaning of a keyword or phrase, the order in which a dictionary provides meanings of a keyword or phrase, an order defined by the system 20 (FIG. 1), or a variety of other methods.

A weighting may be attached to each keyword of a search string for determining how influential a keyword is in determining categories to present to a requester or provider. Weighting factors such as previous use of a keyword as an influential keyword, expected influence based on frequency of high influence associated with the keyword, weight assigned to the keyword by the system 20 (FIG. 1), etc. may be used. For example, when a requester enters the phrase "golden gate bridge pantone" as a search query, the phrase "golden gate bridge" may be weighted higher than other combinations of keywords, e.g., "golden gate" or "bridge pantone", forming the search query. Therefore, when a higher-weighted keyword or phrase shows up in a query string, the higher-weighted keyword or phrase may be prompted to be qualified initially. However, a user may select another keyword in the query string for qualification. Further, the weighting may be calculated on a global basis, decrementing and incrementing the weightings regardless of frequency of use pertaining to the keyword(s) or phrase(s).

The disclosed system 20 (FIG. 1) may also determine relevancy of keywords based on pairing of words in a query string. For example, if the words "golden gate" appear in a query string with other words, the words "golden gate" may be weighted higher in accordance with stored frequency of use pertaining to the pairing. However, it is also possible for the keyword "gate" to be weighted higher over time if the stored usage information indicates more frequent use for the keyword "gate" when the phrase "golden gate" appears in a query string.

When a query is passed on to one or more resources such as search engines, Internet directories, or other searchable resources, to seek information in response to a request, a category pertaining to a meaning selected by a requester may be included in the query. For example, if a search is directed to the keyword "apple" and the keyword "apple" may be followed by inserted word(s) "computer" or "fruit" or "record label" in order to further clarify the meaning of the keyword for the search engines or other searchable resources. In some search resources, categorization may already be a primary component of their technology. An example of a search engine that is based on categorization is Clusty or Kartoo, although there are several others which are developing. An automated interface may be used to send determined category(ies) of this system (from a requester and/or a provider) onto the other resources directly so that results may be much better targeted for the requester and/or provider.

Figure 7:
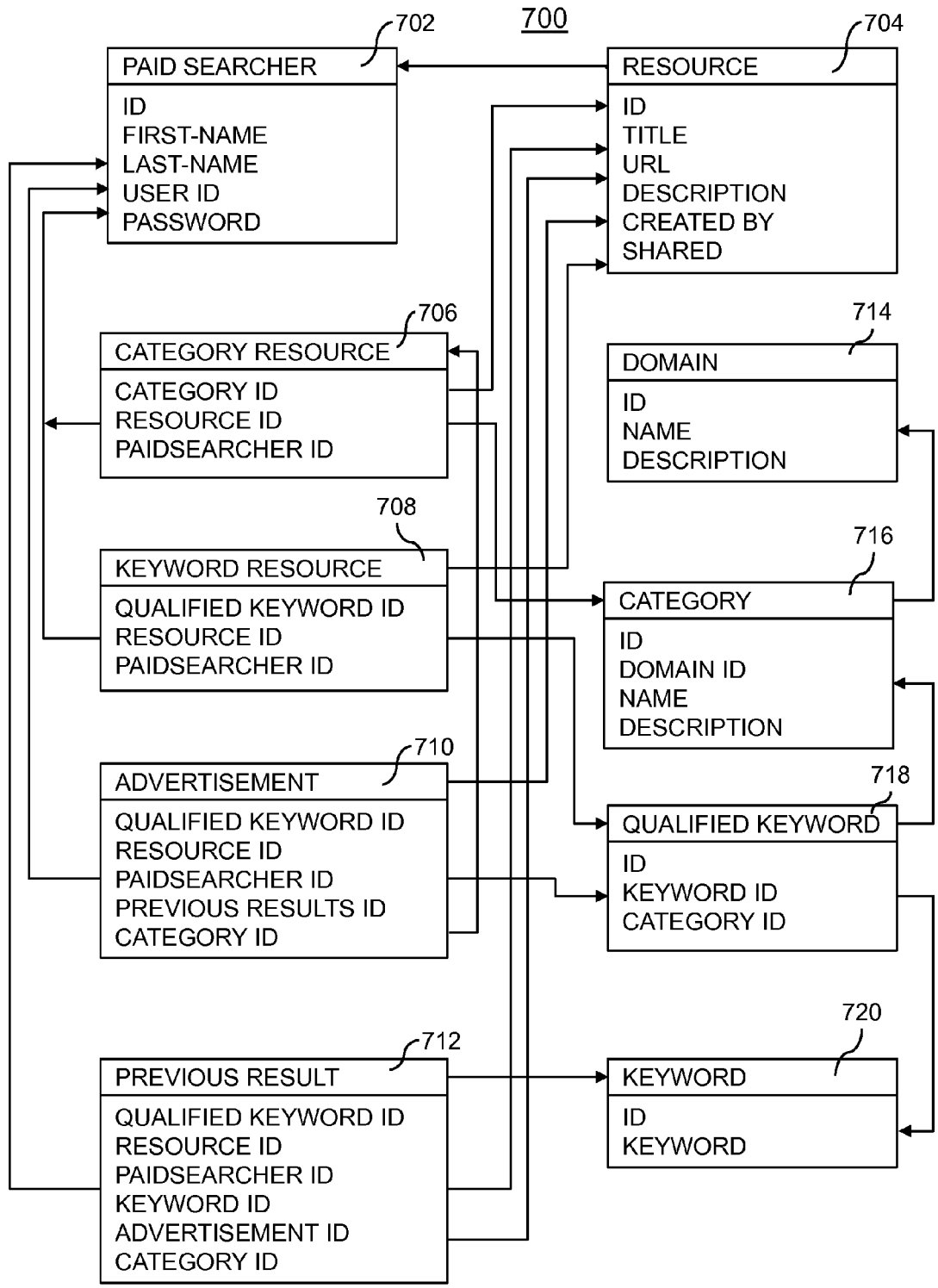
FIG. 7 is a diagram illustrating a relationship between qualified keywords, paid searchers (or guides), previous results, resources, and advertisements.

FIG. 7 illustrates a relationship, such as that created in a relational database 700, among a qualified keyword with a provider, previous results, resources and/or advertisements. As shown in FIG. 7, relational database 700 includes a provider (or PaidSearcher™) data structure 702, the resource data structure 704, the category resource data structure 706, the keyword resource data structure 708, the advertisement data structure 710 and previous result data structure 712. The primary data structures include relationships pointing to other data types including domain data type 714, category data type 716, qualified keyword data type 718 and keyword data type 720. For example, each provider is associated with a Paid-Searcher™ data structure 702 maintaining data related to identification (ID), first and last name, user ID, password, etc., and each resource is associated with a resource data structure 704 maintaining data related to ID, title, URL, description, creator (created by), shared, etc., of the resource. Each illustrated data structure and data type may include more or less data elements within the scope of the disclosure and additional links or relationships between data structures and data types and other data elements, structures or types may be included in relational database 700 and/or database 30 (FIG. 1). Note that a similar structure can be associated with a requester as well as a provider.

An advertisement may alternatively be chosen randomly. For example, advertisement(s) of particular item(s) may be presented to a requester based on factors that may not be associated with a query of the requester such as particular discounted items, new products, etc. A requester may also be presented with an advertisement(s) until an appropriate guide (or provider) is selected when the requester has requested a guide-assisted search. Providers registered to execute searches pertaining to one or more keywords may also select or link advertisement(s) in relation to keyword(s) in real-time to be presented to a requester who has submitted a query containing the keyword(s) based upon the query, keyword(s) and/or the providers' assessment of which advertisement(s) to send. This advertisement choice may be accomplished by enabling a provider to predefine advertisement(s) to be presented to a requester that is assigned to that provider for a particular keyword.

Figure 8:
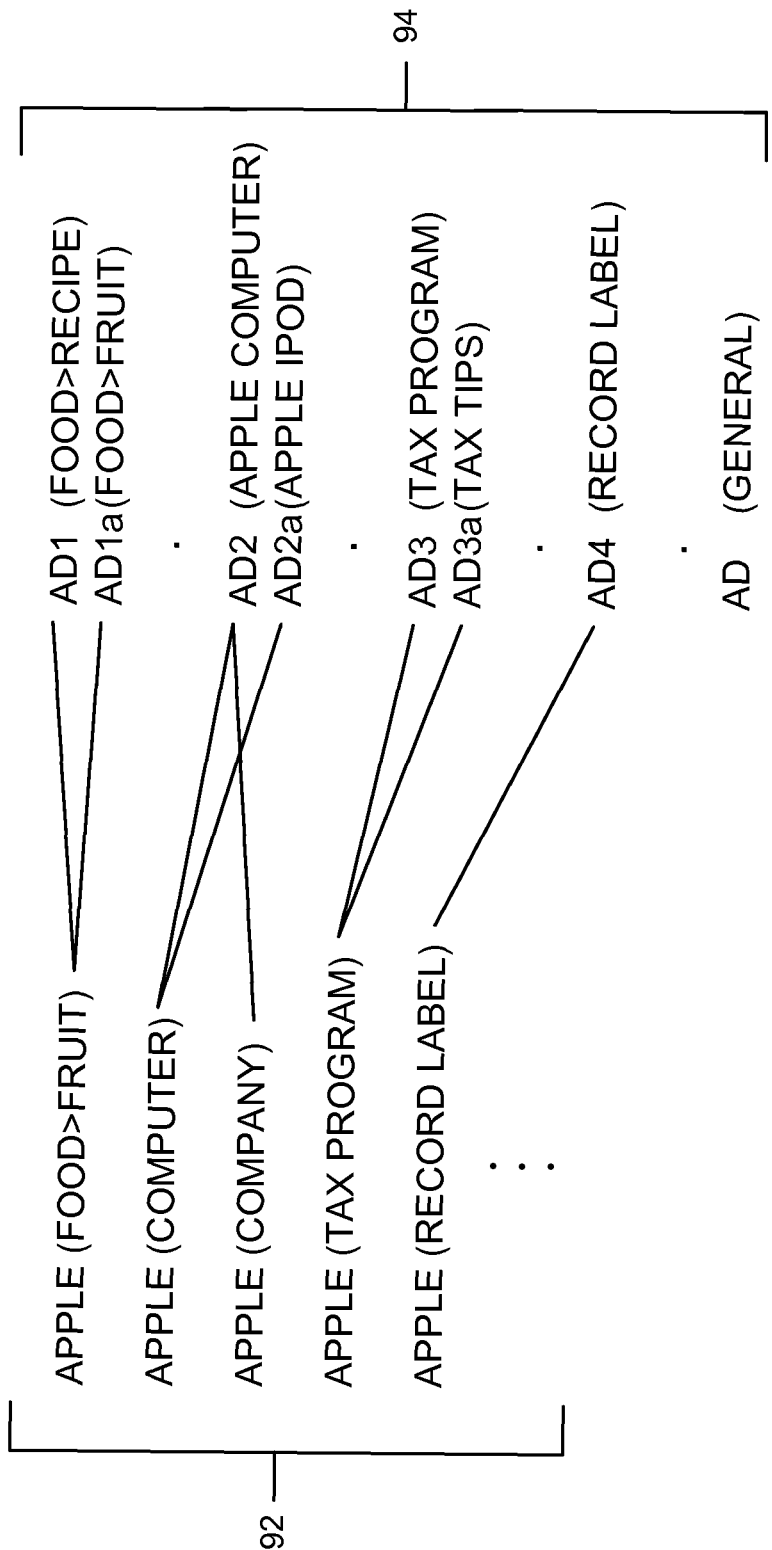
FIG. 8 is a relationship diagram illustrating correlation between qualified keywords and advertisements.

FIG. 8 is a simplified example of a relationship 90 illustrating association of qualified keywords 92 with advertisements 94. For example, if a search query containing the keyword "apple" is qualified to mean the fruit, an advertisement pertaining to a food recipe and/or the fruit may be presented, while an advertisement pertaining to the tax program and/or tax tips may be provided if the keyword "apple" in the query is qualified to mean the tax program.

Any qualified keyword maintained in the database 30 (FIG. 1) may be mapped to advertisement information for presenting one or more targeted advertisement(s) to a requester submitting a query containing the qualified keyword. An advertisement may relate to one or more qualified keywords contained in the query submitted by a requester. For example, upon receipt of a query from a requester via computer 22*a* (FIG. 1), the system manager (server) 26 may provide advertisement(s) to the requester for viewing while a search is being processed by the system 20. This advertisement information may be related to the query (and/or to the keyword(s) of the query), may include visual, audio and/or interactive information, as appropriate for the requester's device and for the source of the query, and can include not only advertisement(s), but also information such as videos, audio, music, games, web links, etc. that may interact with and/or display data to the requester while the search is being performed. The information provided may serve as a source of revenue, for example through advertising. If a requester views an ad, or clicks on a link, or purchases a product (sometimes referred to as "conversion") related to an advertisement, during a search, the database 30 (FIG. 1) may be updated to reflect additional ad revenue with a credit of points and/or compensation, if appropriate, to the provider (or searcher). Further, selection of a particular advertisement may be based on a weight associated with the advertisement based on single or combined factors such as advertiser contract commitments, bidding price of advertisers, popularity with requesters, keyword mapping to advertisements, statistical usage (e.g., least recently presented), user demographics, searcher choice of advertisement, etc.

The advertisement(s) may alternatively be chosen randomly. For example, advertisement(s) of particular item(s) may be presented to a requester based on factors that may not be associated to a query of the requester such as particular discounted items, new products, etc.

Accordingly, a keyword or phrase entered into a query string of a search may be clarified or qualified using a database by prompting a requester and/or a provider to select desired meaning(s) associated with keyword(s) or phrase(s) when building a search query. The meaning of a keyword or phrase entered into a query string to conduct a search is clarified or qualified using information stored in the database 30 (FIG. 1) which maintains a record of keywords/phrases including multiple meanings, forms, and/or categories of the keyword or phrase. When building a search query, if a user (or requester) and/or a guide (or provider) enters a keyword(s) with multiple meanings, the user or a guide may be prompted to identify one or more of the multiple meanings of the keyword(s)/phrase(s).

The database 30 (FIG. 1) may record keywords and may indicate keywords having multiple meanings and/or associated categories. When a keyword(s) is submitted in a query, the system 20 (FIG. 1) determines whether the keyword(s) has multiple meanings associated therewith based on information in the database 30 and prompts a requester or provider (or guide) to clarify which of the meanings the requester or provider (or guide) is intending by enabling the requester or provider to select from a list of meanings in the database. For example, a query directed to "cleaning windows" may refer to sales of Windex® spray or might possibly be a request for Norton® AntiVirus.

The system and method disclosed enables a requester or provider to clarify any ambiguity associated with meanings and categories of keyword(s) contained in a query prior to triggering a search based on the query. Further, searcher(s) may edit the database 30 (FIG. 1) over time to allow for better defined meaning(s) associated with a keyword. For example, at various points in time "ATM" may have meant "Automated Teller Machine", "Asynchronous Transfer Mode", etc., and may have new associated meanings such as "All Terrain Mobility" attached to it in the near future.

Accordingly, a keyword or phrase entered into a query string to conduct a search is clarified and/or qualified using a database containing keywords and phrases including those with multiple meanings or versions. When building a search query, if a user or a provider enters a keyword with multiple meanings, the user or provider may be prompted to identify an intended meaning from one or more of the multiple meanings of the keyword/phrase.

FIG. 9 illustrates a provider (or guide) GUI 900. As shown in FIG. 9, GUI 900 includes a chat window 902 enabling exchange of communication between a guide(s) and a requester, a category window 904, a list of keyword(s) and/or phrase(s) 906 for identifying a keyword or a phrase as a primary object of a search, a current category 908 identifying a category of a current query, a query bar 910 in which a query from a requester is displayed and control buttons 912. Although a few control buttons are illustrated in FIG. 9, the GUI 900 is not limited to any particular type or configuration of interface controls.

A guide, for example, may qualify the request in the query bar 910 by selecting from the list of phrase(s) 906. A guide may also add a new phrase to the list of phrase(s) 906 using an "add new phrase" button 907. For example, for the request directed to "big bang theory", a guide may add the word "publications" to modify the query when the primary object of the search is a publication pertaining to the "big bang theory".

The category window 904 includes a selectable list of keywords parsed from the query 906. The GUI 900 includes category selection options 905 providing a category tree as illustrated in the category window 904, a category list and past categories to provide various ways of viewing and selecting categories. The category list may be presented such that when a guide begins typing characters of a category name, a list of categories matching the characters including respective subcategories is displayed. While the past categories may display a list of categories used previously in association with the selected primary keyword or phrase. By clicking on a category in the category window 904 (or selecting a category using the category list or the past categories), a guide or provider may select a new category to be treated as the most likely category associated with the query. If a new, "most likely" category is selected, resources to be used for a search may change to recommended resources for the newly selected category. Results received from the resources may be "dragged and dropped" or otherwise selected for sending to a requester for display in the results window 1014 of the requester GUI 1000 (see FIG. 10).

Figure 10:
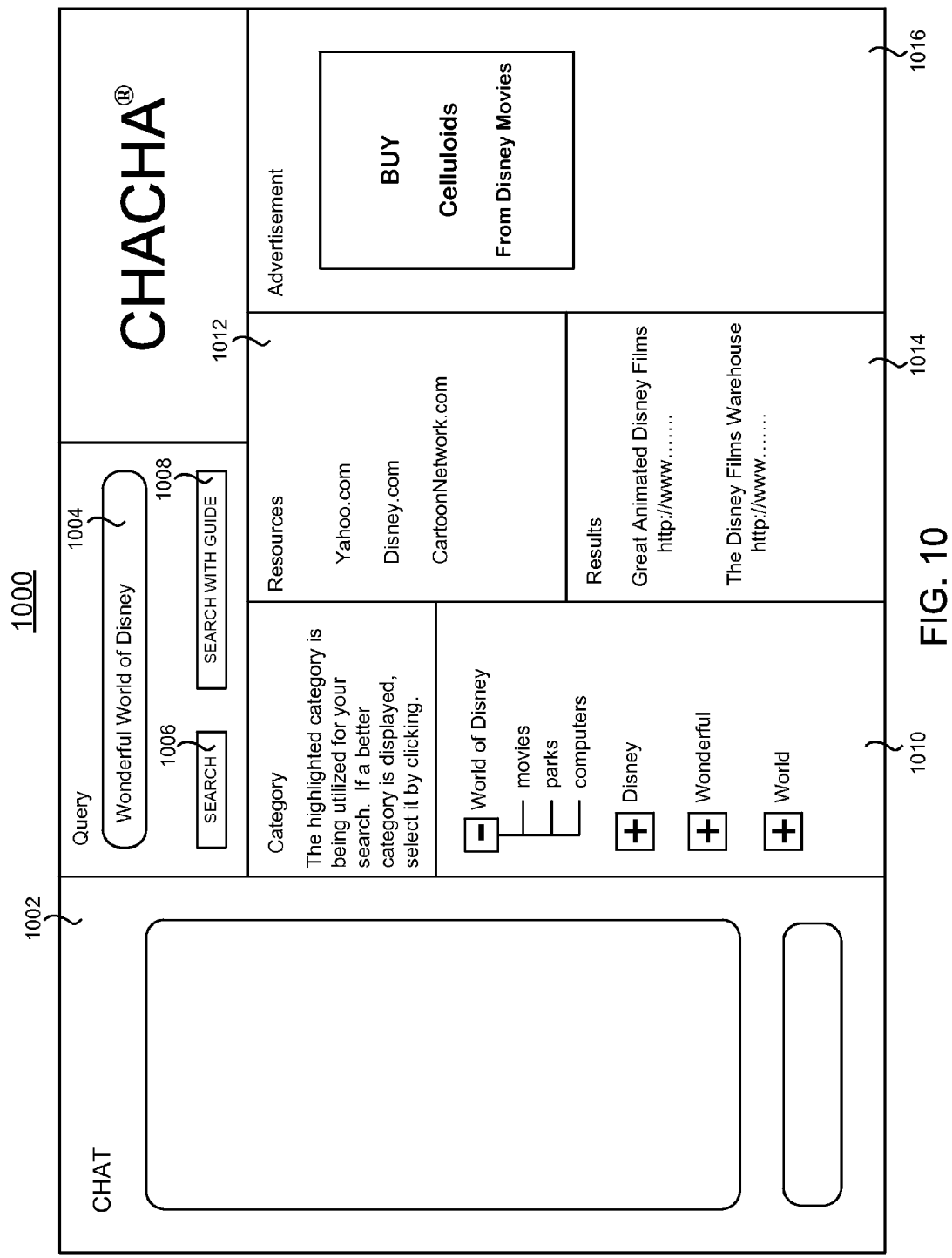
FIG. 10 is an exemplary GUI presented to a requester to aid in qualifying keywords.

As shown in FIG. 10, the requester (user or Infoseeker™) GUI 1000 includes a chat or instant message window 1002, a query box 1004, an unassisted search button 1006, a search with guide button 1008, a category window 1010, a resources window 1012, a results window 1014 and an advertising window 1016. The chat window 1002 allows a provider(s) to communicate with a requester during a search. The category window 1010 includes a selectable list of keywords parsed from the query. The keyword list may be presented in hierarchical tree structure and may be expanded by clicking on a keyword to reveal the category(ies) with which the keyword is associated. The resources window 1012 displays the resources recommended for the most likely category to which the query relates. The resources window 1012 may not be displayed to a requester who has requested assistance from a guide by clicking the search with a guide button 1008. By clicking on a category under a keyword in the category window 1010, a requester may select a new category to be treated as the most likely category associated with the query. If a new "most likely" category is selected, the resources displayed in the resources window 1012 may change to recommended resources for the newly selected category. Additionally, advertisement(s) displayed in the advertisement window 1016 may change to advertisement(s) associated with the new category.

Figure 11:
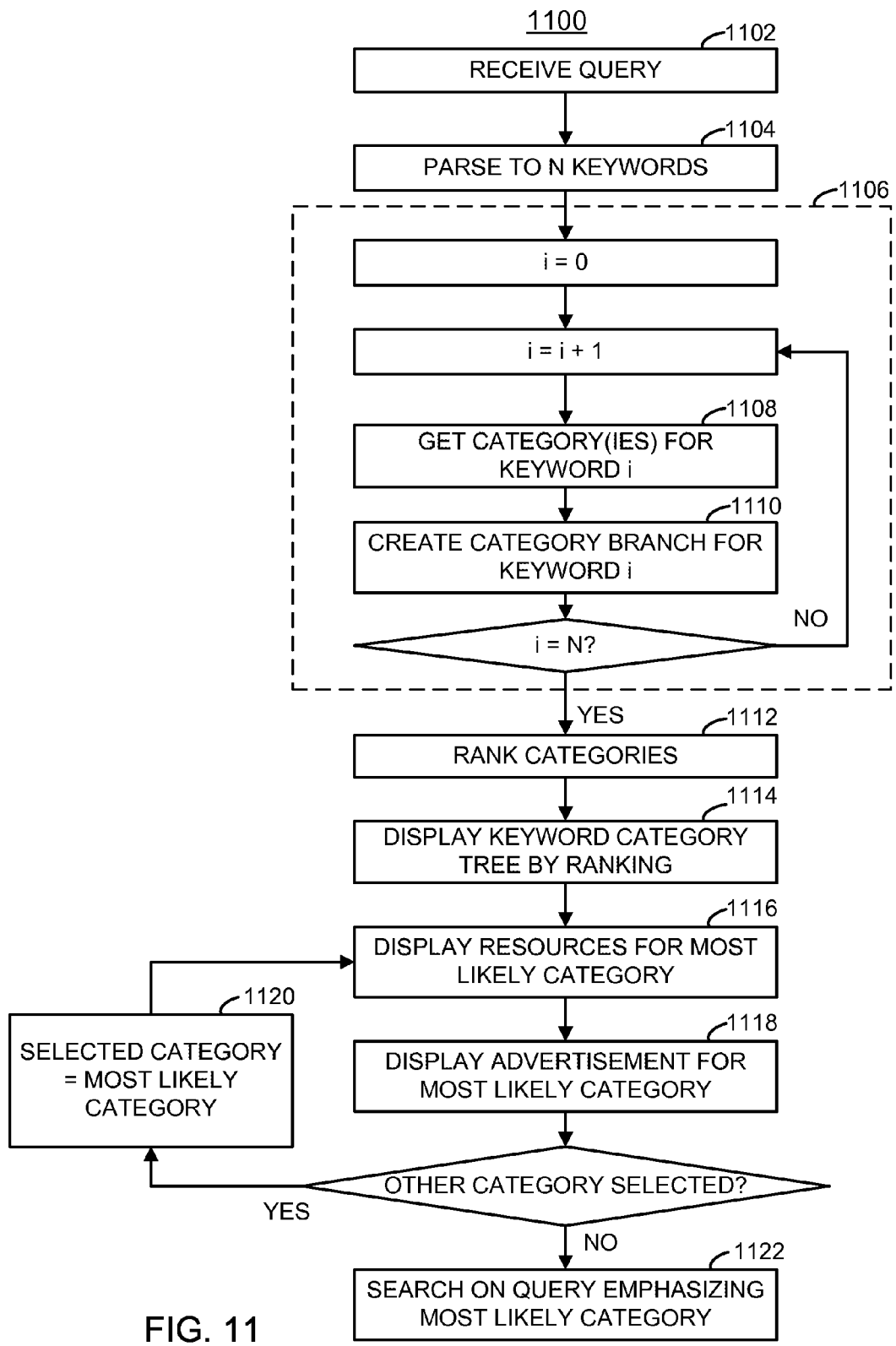
FIG. 11 is an exemplary flowchart illustrating presenting a keyword category, recommended resources and targeted advertising.

As shown in FIG. 11, a method 1100 of qualifying keywords in a query string includes receiving 1102 a query and parsing 1104 the query into n keywords (which may include individual words, stems of words and/or phrases). By using a loop or initiating multiple tasks 1106, for each of the n keywords developed from the parsing 1104, all of the identified category(ies) with which each keyword is associated are gathered 1108 and a category branch is created 1110 for each keyword. The category(ies) gathered during loop 1106 are ranked 1112 and a keyword category tree is displayed 1114 in accordance with the ranking. Resource(s) for the most likely category of a keyword are displayed 1116 and advertisement(s) for the "most likely" category are displayed 1118. A user, which may be a provider utilizing a provider interface such as that shown in FIG. 9 or a requester utilizing a requester interface such as that shown in FIG. 10, may select a category other than the one ranked as the "most likely" category by the system 20 (FIG. 1). If a requester or provider selects a category other than a category identified by the system 20 (FIG. 1), the selected category is treated as the "most likely" category 1120 and displaying resource(s) 1116 and displaying advertisement(s) 1118 are modified to display resource(s) and advertisement(s) associated with the selected category. A search is conducted 1122 on the query emphasizing the "most likely" category.

The qualification of keywords may be valuable in a number of other ways. For example, qualification of keywords allows for more targeted monitoring and controlling of advertisements which are associated with particular keywords. For example, a car rental company could be prevented from attaching advertisements to competitor car rental company keywords by performing a lookup in the database of all trademarks and preventing an advertiser from signing up for keyword(s) in its industry unless it owns particular trademark(s).

The disclosed method and system may further use a specialized taxonomy for querying a database, for example, in looking for "similar" visual patterns, such as fingerprints, images, and/or faces, etc. Likewise other matching systems that use different "alphabets" and/or syntax such as DNA profiles, or variously analyzed images could be used in conjunction with the method and system to help a searcher narrow (or expand) an area of a query in order to find a more suitable target.

The many features and advantages of the claimed invention are apparent from the detailed specification, and thus, it is intended by the appended claims to cover all such features and advantages of the claimed invention that fall within the true spirit and scope of the invention. Further, since numerous modifications and changes will readily occur to those skilled in the art, it is not desired to limit the invention to the exact construction and operation illustrated and described for the disclosed embodiments, and accordingly all suitable modifications and equivalents may be resorted to, falling within the scope of the claimed invention. It will further be understood that the phrase "at least one of A, B and C" may be used herein as an alternative expression that means "one or more of A, B and C."

What is claimed is:

1. A method, comprising:
ranking categories of a keyword detected in a query;
ranking a category based on human assisted searches performed for queries indicating the keyword;
choosing a human search assistant based on the keyword;
providing content identifying the query, the keyword and the category to the human search assistant when the category is ranked highest; and
qualifying the query based on the category and an action received when the human search assistant is performing a search.

2. The method of claim 1 further comprising:
ranking the category based on a number of human search assistants registered for the category.

3. The method of claim 1 further comprising:
choosing the human search assistant based on a ranking of the human search assistant for the category.

4. The method of claim 1 further comprising:
submitting the query to a search resource associated with the category and the keyword when the query is qualified by the category and the keyword.

5. The method of claim 1 further comprising:
choosing the human search assistant based on a ranking of the human search assistant for a keyword associated with the category when a search assistant registered for the keyword and the category is not available.

6. The method of claim 1 further comprising:
selecting advertising content which is presented responsive to the query based on a ranking of the content for the category.

7. The method of claim 1 further comprising:
presenting a search result obtained by submitting the query to a search resource ranked highest for the category and the keyword to the human search assistant.

8. The method of claim 1 further comprising:
providing content identifying the highest ranking categories in an order based on the ranking.

9. The method of claim 1 further comprising:
selecting words of the query as the keyword based on an action of the human search assistant; and
ranking the category based on the words.

10. The method of claim 1 further comprising:
ranking the category based on ratings of human search assistants performing the searches.

11. The method of claim 1 further comprising:
ranking the category based on information of a user submitting the query.

12. The method of claim 1 further comprising:
providing the content to a user submitting a request including the keyword.

13. The method of claim 1 further comprising:
directing the query to a resource determined by the qualifying when a user selects an automated search; and
directing the query to the human search assistant when the user selects a human assisted search.

14. The method of claim 13 further comprising:
presenting resources ranked based on the qualifying to the user; and
qualifying the query based on an action received from the user.

15. A system comprising:
a search system device comprising a processor and memory receiving a query, ranking categories of a keyword detected in the query, ranking a category based on human assisted searches performed for queries indicating the keyword, choosing a human search assistant based on the keyword, providing content identifying the query, the keyword, a search resource selected by the keyword and the category and the category to the human search assistant when the category is ranked highest, and qualifying the query based on the category and an action received when the human search assistant is performing a search.

16. The system of claim 15 comprising:
a user device submitting the query; and
a searcher device receiving the content, and providing the action.

17. A non-transient computer readable storage medium having an instruction stored therein for causing a computer to execute an operation including qualifying a keyword, comprising:
ranking categories of a keyword detected in a query;
ranking a category based on human assisted searches performed for queries indicating the keyword;
choosing a human search assistant based on the keyword when a human assisted search is requested;
providing content identifying the query, the keyword and the category to the human search assistant when the category is ranked highest; and
qualifying the query based on the category and an action received when the human search assistant is performing a search.

18. The non-transient computer readable storage medium of claim 17 wherein the operation further comprises:
ranking keywords of the query; and
selecting categories associated with a highest ranking keyword of the query.

19. The non-transient computer readable storage medium of claim 17 wherein the operation further comprises:
ranking the category based on a rating of the category for each keyword of the query.

20. The non-transient computer readable storage medium of claim 17 wherein the operation further comprises:
adding categories to the ranking based on an action of the human search assistants and ratings of the human search assistants.

* * * * *